Dec. 5, 1933. J. D. ASHLEY, JR., ET AL 1,937,864

NONREMOVABLE CLUTCH OR FRICTION GRIP

Filed Jan. 9, 1932

Inventor:
John D. Ashley, Jr.
and Francis C. Menamin by Lester Sargent
Atty.

Patented Dec. 5, 1933

1,937,864

UNITED STATES PATENT OFFICE 1,937,864

NONREMOVABLE CLUTCH OR FRICTION GRIP

John D. Ashley, Jr., and Francis C. Menamin, Philadelphia, Pa., Mollie A. Menamin, executrix of said Francis C. Menamin, deceased, assignors to Adolph C. Moeller, John D. Ashley, Jr., and David E. Rattin, individually and trading as Electric Meter Lock Company, Philadelphia, Pa.

Application January 9, 1932. Serial No. 585,738

1 Claim. (Cl. 85—36)

Our invention relates to a gripping or clutching device which can not be removed from the assembly after it has been applied, without destruction of the component parts, being designed to automatically interlock the parts, allowing the parts to be freely moved forward in the one direction, but not to be withdrawn nor removed in the opposite direction.

By our invention we produce a quick gripping device which allows the sliding parts to be freely moved in one direction but hold them firmly when pulled in the opposite direction.

The particular application being to any sliding rod or screw part to which the invention may be applied but from which part it can not afterwards be removed without breaking.

The invention is by the construction suggested, made simple, durable and cheap so that after its use it may be easily destroyed in order to separate it and a new device substituted to replace it.

Our invention is particularly applicable to projecting studs extending out through any box-like structure used to cover and protect internal mechanism within the cover, making it impossible to remove the cover without destruction of the invention after the invention has been set into place over the projecting stud.

Similar letters of reference denote like parts in all the figures.

The invention is illustrated in the accompanying drawing.

Figure 3:
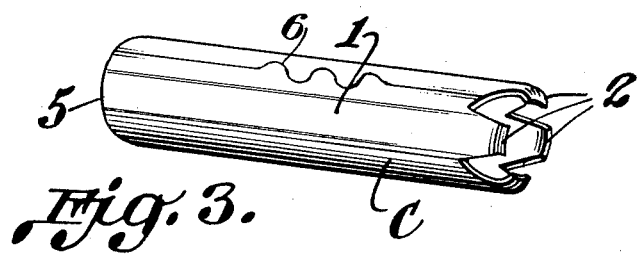
Figure 4:

Fig. 3 is a perspective view of the tubular, internal or central part of the device which slips over and engages the stud or rod as the latter is pushed past the inturned retaining teeth 2; and Fig. 4 is a perspective view of tubular cover d of any suitable thin material, closed at one end by pinching or casting and which cover slips over the internal device C of Fig. 3 to protect it from the flow of glass or other frangible material constituting the external body A.

Figure 1:
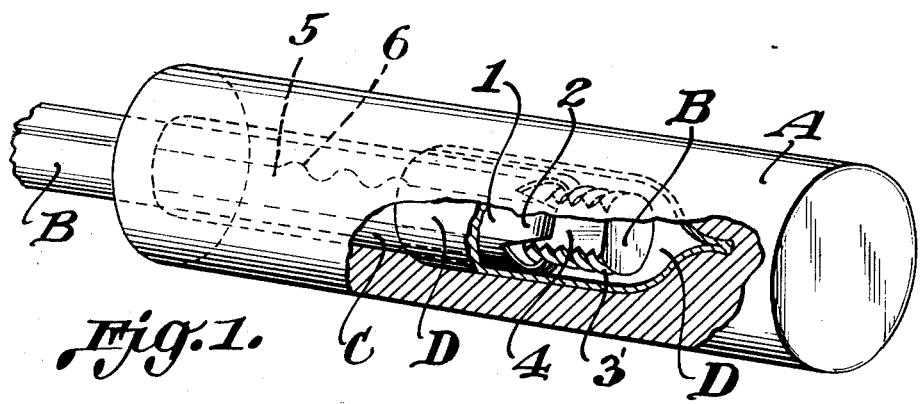
Figure 1 is a perspective view of the outer casting a and stud b with a portion of the casting a and shell d broken away to show the interior construction of the device.

Referring to the drawing, in Fig. 4 there is illustrated the inner locking shell C closed or pinched together at the end as shown in Fig. 1, to limit the travel of stud B, and having inturned or L-shaped fingers 2 to engage flattened portion 4 of the threaded end 3 of a conventional stud B; or alternatively to engage the annular grooves 3' (not spiral) in the preferred form of stud shown in Fig. 1 of the drawing.

The assembled invention, Fig. 1, shows the outer casting A, preferably of opaque glass or any suitable frangible or brittle material which is cast around the central part of the device, consisting of locking shell C and cover shell D, which form the core or center of said device and forms the entire shell open only from one of its ends represented by the internal portion of the locking shell C, the open end 5 being flush with the cast end of the covering material or outer casting A to allow the entrance of the stud B from that end only. B represents the stud or other member to be gripped to prevent unauthorized opening of the door to the electric meter box. D is slipped over C to keep out the flow of the glass, or other plastic material, from the internal cavity of C while the entire device is being cast.

After A has been cast around the members C and D the members A, C and D are then in a fixed assembly open only at one end through the hollow cylinder formed by the members C and D. The completed device or invention is therefore shown in Figure 1 gripping the stud B.

Figure 2:
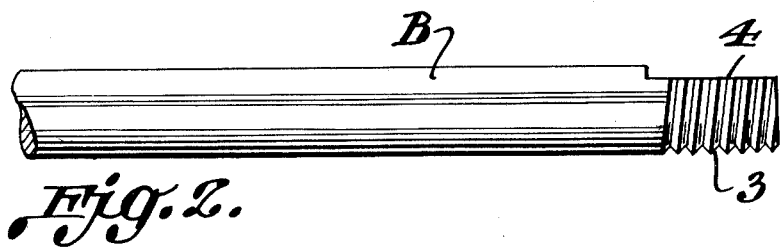
Fig. 2 is a side elevation of a conventional stud with a part of the threaded portion cut away at 4.

As shown in Fig. 2, the stud B, such as now in use on electric meter boxes, is flattened upon one side to a required amount as at 4, said flattening being a part of this invention to prevent the assembled device from being slipped off of the stud B by rotation along the lines of the threads 3, the slipping off being prevented by the inturned fingers 2 of shell C which engage the flattened part 4 of the stud B thereby preventing side motion around the pathway of the threads 3.

The device so constructed is to prevent the device being slipped off by rotation along the threads of any conventional screw, bolt, or stud, when such usual ordinary stud or bolt is shaped for use or fitted with this invention, but preferably the stud or bolt over which the device is slipped should be specially cast or made with annular rings and grooves 3' at close intervals as shown in Fig. 1, instead of the threads 3 of the ordinary screw type.

The device is operated substantially as follows: The members A, C and D are cast together by the fusing of casting A around shells C and D; and the device thus formed is slipped over the stud B through the opening 5, the flattened section 4 of member B being turned to engage one or more of the fingers 2 of member C to prevent any rotary movement around the stud B or any removal of the device without breaking of the brittle or frangible casting A. This is only necessary where the bolt or stud is threaded with ordinary threads, and is unnecessary in the specially constructed stud or bolt, with annular indentations 3' in lieu of threads, as shown in Fig. 1.

As the stud B passes the teeth 2 of locking shell C the teeth engage the indentations or grooves in the stud B, which indentations may be in the form of threads of a screw or may be mere indentations in the stud B, or annular grooves 3' as shown in Fig. 1; and as the stud B is slipped within the assembled device, the teeth 2 are freely enabled to pass the indentations in B while going in the entering direction, but can not be withdrawn without leaving evidence of tampering owing to the spring material of which the teeth 2 of metal locking shell C are composed, and their depressed or inturned ends which firmly engage the grooves of stud B as it is attempted to be withdrawn.

The pressing of the entire device tightly up against any box or cover which may be covering the protected mechanism within the box, such as an electric meter, effectually prevents the insertion of any instrument through the opening 5 to release the teeth 2 from the indentations or grooves 3 or 3' although the invention can be readily removed upon the destruction of the outer glass or other flangible casting A, thereby compelling the destruction of the teeth 2 or the glass casting A to remove the device. Tampering with the device results in breaking either the teeth 2 or the casting A, and any tampering with the device is thereby disclosed.

To remove the device for access to the protected machinery within the box or casing protected, it is only necessary to crush or split the glass or other flangible casting A and remove that portion whereupon the shells C and D may be removed from B without injuring B as the teeth 2 of locking shell C can be sprung open when casting A is removed. A new device can be slipped over the stud B when the work upon the protected internal mechanism has been completed; the device being inexpensive and replaceable at small cost by authorized representatives of the company controlling the apparatus concerned.

The teeth 2 are so slanted with relation to the indentations or grooves in B that they will readily slip over the indentations or grooves 3 or 3' in one direction but can not be withdrawn in the opposite direction owing to the pressure of the teeth 2 against the indentations or grooves in stud B.

In order to secure the firm retention of the internal members C and D within the covering portion of the glass A after the entire device is cast into a completed unit, it may be best to have the overlapping edge of the member C slightly raised into a corrugated ridge as at 6, Figure 3, to engage the interior of the cast glass A and avoid being pulled out.

The casting A may be made of wood or of any suitable frangible or brittle material suitable for preventing access to the internal portions of the invention.

The teeth 2 of the locking shell C are of spring metal or material of any desired nature of sufficient elasticity to keep up a constant pressure of 2 upon the indentations or grooves 3 or 3' or flattened surface 4, which allows a forward movement but prevents a retracting one.

The term "indentations" in the following claim shall be construed to include annular grooves as shown in Fig. 1 or a flattened surface as shown in Fig. 2, on the end of the stud member.

What we claim is:—

The combination of tubular members, one extending within the other, the innermost member being a stud having grooves on one end and having a flattened section on the same end which flattened section extends down along said member for a part or the entire distance to its other extremity, and another of said tubular members being a locking shell having teeth constituting a gripping device for engaging the grooves on the stud member when inserted within the said device, the aforesaid locking shell being of spring metal which will keep the teeth of the locking shell constantly in contact with whatever stud is inserted therein and adapted to engage the flattened section of said stud and disposed to follow the flattened surface upon longitudinal movement.

JOHN D. ASHLEY, Jr.
FRANCIS C. MENAMIN.